April 10, 1951     A. TAMOL     2,548,077
HEDGE AND WEED CUTTER
Filed May 7, 1947
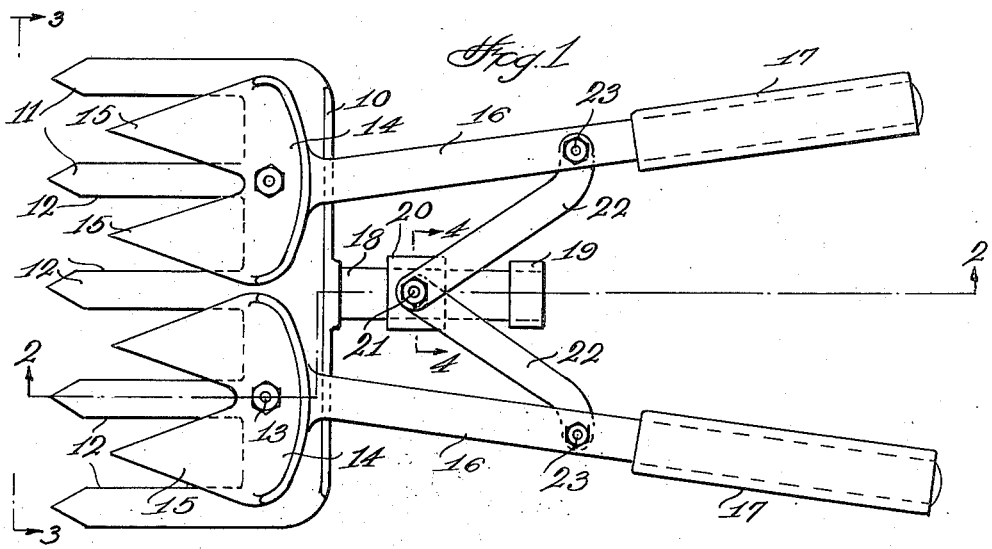
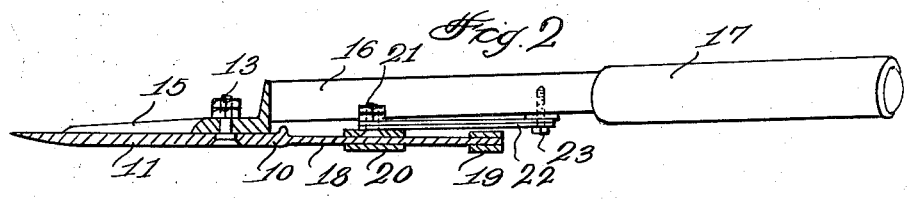
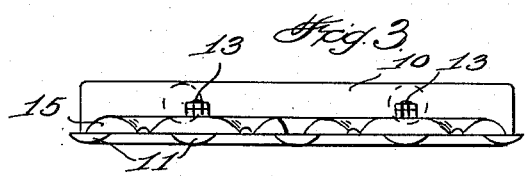
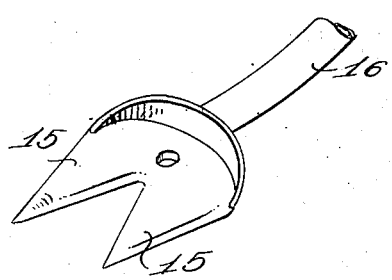
Inventor
Adam Tamol
By Randolph & Beavers
Attorneys Patented Apr. 10, 1951

2,548,077

UNITED STATES PATENT OFFICE 2,548,077

HEDGE AND WEED CUTTER

Adam Tamol, Buffalo, N. Y.

Application May 7, 1947, Serial No. 746,489

1 Claim. (Cl. 30—211)

The present invention relates to hedge and weed cutters and it consists in the combinations, constructions and arrangements of parts herein described and claimed.

Generally, the invention comprises a hedge and weed cutter having a plurality of stationary teeth and a plurality of coacting movable teeth together with means for limiting the movement of the movable teeth in either direction.

It is an object of the invention to provide in a device of the character set forth above means for limiting the movement of the movable blades of a hedge cutter.

A further object of the invention is the provision of means whereby a shearing action may take place between the movable and stationary blades of a hedge cutter or the like.

Other and further objects of the invention will become apparent from a reading of the following specification taken in conjunction with the drawings, in which:

Figure 1 is a plan view of an embodiment of the invention,

Figure 2 is a sectional view taken along line 2—2 of Figure 1,

Figure 3 is an end view taken in the direction of the arrows 3—3 in Figure 1,

Figure 4 is a sectional view taken along line 4—4 of Figure 1, and

Figure 5 is a fragmentary perspective view of an element of the invention.

Referring more particularly to the drawings, there is shown therein a cutter having a frame 10 formed with a plurality of outwardly extending blades 11 having parallel sides 12. To the frame 10 is pivoted by means of bolts 13 or the like a pair of cutting members 14 each having a pair of pointed blades 15 and each provided with a rearwardly extending arm 16 to the free end of which is affixed, in each case, a handle 17.

A shaft 18 extends rearwardly from the frame 10 and is provided with a stop 19 at its outermost end.

Slidably mounted upon the shaft 18 is a collar 20 to the upper side of which is pivoted by means of a bolt 21 or the like a pair of links 22 whose outer ends are pivotally connected as indicated at 23 to the arms 16, respectively.

In operation, it will be apparent that movement of the blades 15 with respect to the blades 11 will cause a shearing action therebetween due to the fact that the sides of the movable blades 15 are angularly disposed with relation to the sides of the blades 11. Further, it will be apparent that movement of the blades 15 in either direction will be limited by means of the collar 20 abutting the frame 10 in one direction and the stop 19 in the other thus assuring that no contact may had between the movable blades nor with the hands of the operator.

While but one form of the invention has been shown and described herein, it will be readily apparent to those skilled in the art that many minor modifications may be made without departing from the spirit of the invention or the scope of the appended claim.

What is claimed is:

A device of the character decribed including a frame formed with a plurality of parallel double-edged blades, a pair of cutting members pivotally mounted on said frame and each having a pair of integrally formed V-shaped blades adapted to coact with the blades formed in the frame and means for moving the cutting members, said means for moving the cutting members comprising a handle formed integrally with each of the members and means for limiting the movement of the cutting members comprising a shaft formed at the rear of the frame, a collar slidably mounted on the shaft, a stop member affixed to the outer end of the shaft and a link interconnecting each handle and the collar.

ADAM TAMOL.

REFERENCES CITED

The following references are of record in the file of this patent:

UNITED STATES PATENTS

| Number | Name | Date |
|---|---|---|
| 999,135 | Volnagel | July 25, 1911 |
| 1,775,627 | Tollmann | Sept. 9, 1930 |
| 1,921,520 | Green | Aug. 8, 1933 |
| 1,980,092 | Rose | Nov. 6, 1934 |

FOREIGN PATENTS

| Number | Country | Date |
|---|---|---|
| 2,242 | Great Britain | Jan. 30, 1909 |
| 543,046 | France | May 26, 1922 |